United States Patent

Mantegazza et al.

[11] Patent Number: 5,228,504
[45] Date of Patent: Jul. 20, 1993

[54] HEAT EXCHANGER

[75] Inventors: Mario Mantegazza, Casalserugo; Luciano Bellemo, Sottomarina, both of Italy

[73] Assignee: MTA srl, Padua, Italy

[21] Appl. No.: 738,630

[22] Filed: Jul. 31, 1991

[51] Int. Cl.$^5$ ............................................. F25D 17/06
[52] U.S. Cl. .................................... 165/111; 165/10; 62/93; 62/437; 62/434
[58] Field of Search ............... 165/70, 140, 10, 104.11, 165/111; 62/93, 434, 436, 437

[56] References Cited

U.S. PATENT DOCUMENTS

| | | | |
|---|---|---|---|
| 2,142,856 | 1/1939 | Lieb et al. | 62/437 |
| 4,319,630 | 3/1982 | Hronek et al. | 165/70 |
| 4,546,818 | 10/1985 | Nussbaum | 165/140 |
| 4,638,852 | 1/1987 | Basseen et al. | 62/93 |
| 4,646,819 | 3/1987 | Pridham | 62/93 |

FOREIGN PATENT DOCUMENTS

| | | | |
|---|---|---|---|
| 2360257 | 6/1975 | Fed. Rep. of Germany | 165/70 |
| 767866 | 2/1957 | United Kingdom | 165/70 |

Primary Examiner—Albert W. Davis, Jr.
Attorney, Agent, or Firm—Dowell & Dowell

[57] ABSTRACT

A tube and fin heat exchanger having two adjacent fluid circuits through which compressed air and a refrigerant fluid flow so as to be in heat exchange relationship with respect to one another. In one embodiment, the areas between the tubes and fins of the heat exchanger are filled with a mass of moist material which ices and operates to accumulate energy to thereby transfer the energy when the refrigerant fluid is not circulated.

7 Claims, 1 Drawing Sheet

HEAT EXCHANGER

BACKGROUND OF THE INVENTION

1. Field of the Invention

The present invention is directed to heat exchangers having tubes which are interconnected by heat transfer fins.

2. History of the Related Art

In gas plants or in compressed gas mixture plants, the gas coming from the compressors contain a considerable quantity of water in the form of vapor. Since this vapor is noxious, it is necessary to condense the vapor and eliminate it from the gas flow.

SUMMARY OF THE INVENTION

This invention is directed to a tube and fin heat exchanger wherein heat is exchanged between two fluids which flow through different circuits and which are placed at an optimal distant from each other and wherein each circuit extends directly through the fins of the exchanger. The moist air from a compressor passes through the first fluid circuit in such a manner that the dry outlet gas is used to precool the humid inlet gas before such inlet gas passes in heat exchange relationship with the second fluid circuit which may be a refrigerant circuit.

Therefore, the first fluid circuit inside the tube and fin heat exchanger is designed so that the conduits leading from the gas or fluid inlet are located near to conduits leading to a dry air outlet. This relationship allows heat exchange between the humid inlet gas coming from a plant compressor and the dry outlet gas which has been cooled within the exchanger. Consequently, the humid inlet gas is cooled transferring heat to the dry outlet gas which is heated. A mass of material may be placed between the fins of the heat exchanger and may be soaked with water or other fluids to thereby increase the heat exchange efficiency of the heat exchanger.

DESCRIPTION OF THE PREFERRED EMBODIMENT

Tube and fin heat exchangers are utilized with copper tubes which may be, for example, ⅜ inch diameter tubes and wherein the optimal pitch of the coiling of the tubes is 25×12.5. The pitch of the tubes, however, can be modified to 25×22 or 25×19. The fins are made from either aluminum or copper and are placed at a distance of between 1.5 and 4 mm from one another. Optimum results can be obtained with the fins being placed at 1.5 mm from each other and with the tubes being pitched at 25×12.5.

Figure 1:
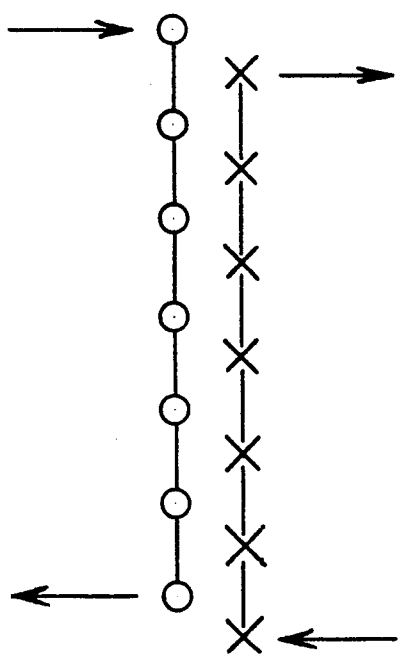
FIG. 1 is a schematic diagram of a first concept of the present invention.

In FIG. 1, the operation diagram of a first embodiment of the tube and fin heat exchanger is shown. The tubes through which the air to be dried flows are indicated with a circle while the tubes through which the cooling fluid flows are indicated with a cross. A series of parallel fins is placed at right angles with respect to the circuit tubes. Since there is no direct contact between the first fluid and the tubes containing the second fluid, in order to obtain an efficient heat exchange, the two circuits have been placed very close to one another and have been altered or staggered in a chess-board configuration. Also, the fins are made of high conductivity material, such as aluminum or copper, and are placed very close with respect to one another.

Figure 2:
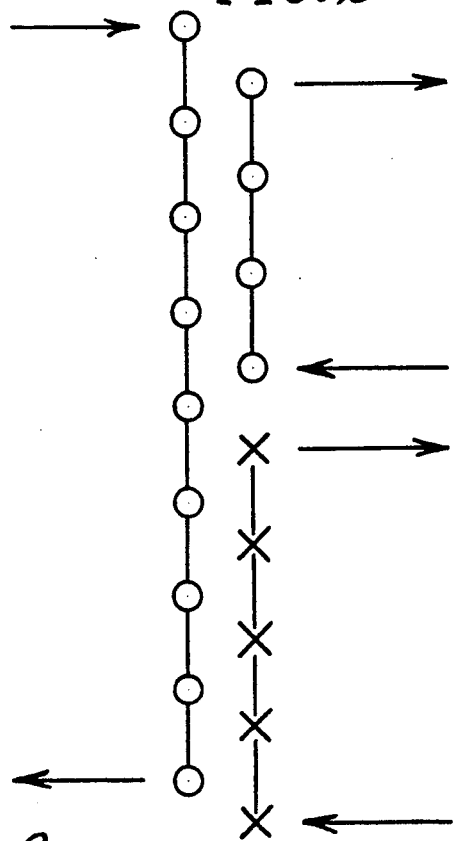
FIG. 2 is a schematic diagram of a second concept of the present invention.

With respect to refrigerating cycle dryers for compressed air which utilize both an evaporator and an air-to-air heat exchanger, the invention consists in dividing the fin and tube heat exchanger into three circuit sections, as shown in FIG. 2. The moist air coming into the dryer enters the first circuit and a first section is cooled by exchanging heat with the compressed air which has passed through the same circuit. Subsequently, the first circuit is cooled by heat exchange with a phase change refrigerant which flows through the second circuit. Instead of a phase change refrigerant, it is possible to use a liquid, for example a mixture of water and glycol, which is brought to a sufficiently low temperature. In this manner a very compact fin and tube heat exchanger has been constructed which includes two heat exchange sections and in which the metallic continuity is maintained by the fins between the tubes of the sections thereby further enhancing heat exchange efficiencies.

The humid air at a temperature of 40° C. begins to cool in the first section before coming into contact with the refrigerant fluid in the second fluid circuit. The air of the first circuit which is coming out at a temperature of about 3° C. (dew point) having had the liquid removed therefrom, while the dry air, at a temperature of about 3° C., before being expelled from the heat exchanger, flows through coils placed in heat exchange relationship with the inlet moist air. The dry air absorbs heat from the moist inlet air and is heated so that it reaches temperature of about 20°–30° C.

In addition to the foregoing, the heat exchangers may incorporate a thermal transfer mass which is in conformity with an adjustment system of the refrigerant circuit. The thermal transfer mass can be made utilizing fluids or solid materials having small granularity. The granules should be small enough to guarantee the filling of the spaces between the tubes and fins. Such materials may be sand, metal powders, cement, agglomerates, hydraulic limes or the like, and which may be either dry or moist. The close spacing of the fins insures an optimal thermal exchange even in the presence of the thermal mass created by these low conductivity materials. These materials are inexpensive, completely nontoxic and easy to handle and introduce into the exchanger.

Using a thermal mass soaked with water, it is possible to reduce the temperature of the water to less than 0° C. and thereby freeze it. This considerably increases the heat transfer efficiency of the thermal mass because of the latent heat offusion of the water. As the fluid to be cooled is moist compressed air, a problem arises if the water which condenses during the cooling phase freezes. Since the heat exchange process takes place because of a temperature gradient, it is possible to check the temperature of the thermal mass in order to stop the compressor (I) associated with the refrigerant circuit and thereby prevent icing of the tubes through which the humid compressed air flows.

By placing temperature sensors or probes in contact with the fins of the heat exchanger inside the thermal mass, it is possible to adjust the temperature therein so that the temperature of the fluid to be cooled can be almost constant. The presence of ice in the mass placed between the fins increases the thermal efficiency and lowers the average operating temperature of the system thereby prolonging the time in which the compressor of the refrigerant system is in an "off" mode.

Figure 3:
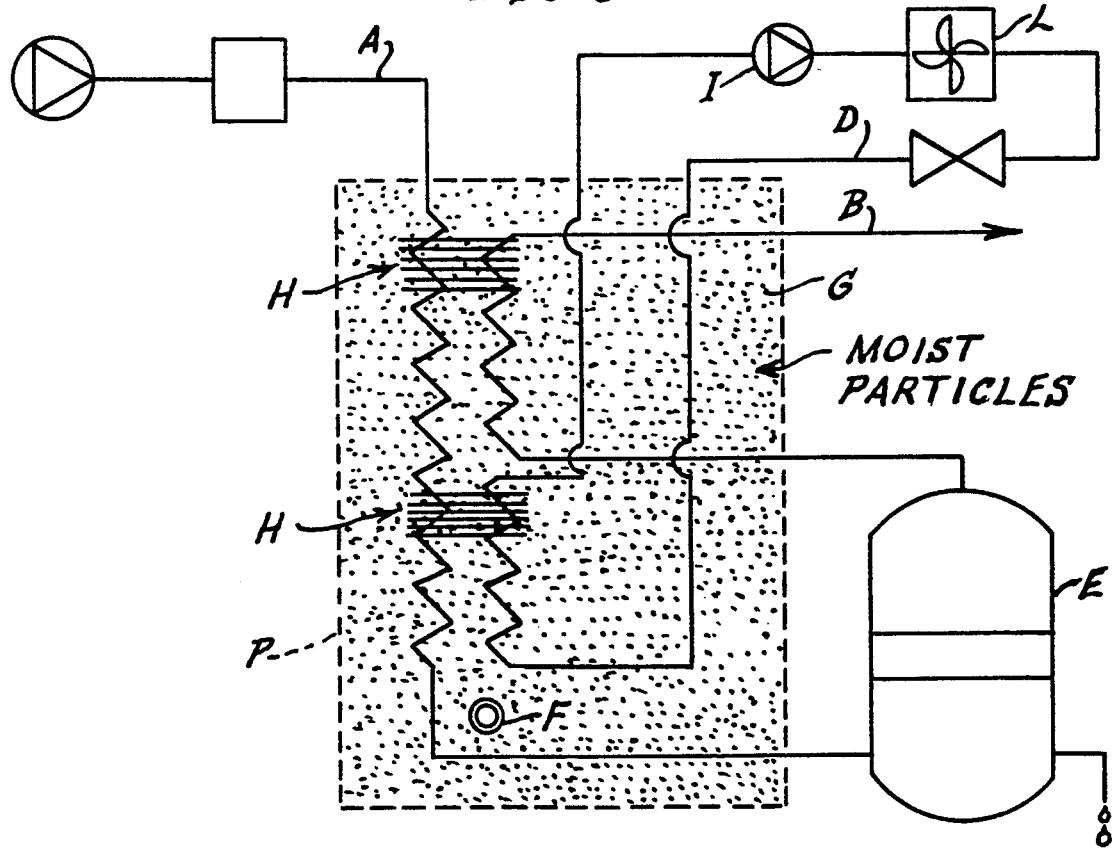
FIG. 3 is a schematic diagram of a refrigerant cycle dryer for compressed air in accordance with the teachings of the present invention.

In FIG. 3 the operating circuit of the dryer of the present invention is shown wherein (A) indicates the inlet section of pipe of the moist compressed air fluid circuit and (B) indicates the outlet dry air pipe section of the circuit. The two coil pipe sections are adjacent one another so that pipe (A) with the air to be cooled transfers heat to pipe (B) of the outlet dry air with the heat being transferred through fins (H) of the heat exchanger. Subsequently, pipe (A), in which the air to be cooled flows, passes adjacent to the tubes (D) of a refrigerant circuit through which the refrigeration fluid flows. Moisture is removed from the first fluid circuit in a condensate trap (E). A thermostat (F) is used to regulate the temperature of a mass of material (G) placed between the tubes (D) of the refrigerant circuit and (A) and (B) of the first circuit of the fluid to be cooled. Coils of the tubes (D), (A) and (B) and moist sand or other material are contained in a housing the walls of which are made and/or covered with a thermal insulating material (P). The mass of moist material which ices has a function of storing energy to transfer it to the first fluid to be cooled when the refrigerant fluid circuit is not circulating thereby reducing the amount of time the compressor (I) of the refrigerant circuit is operated. The refrigerant circuit also incorporates a condenser (L).

These are schematic examples that should be sufficient for a skilled reader to understand the invention. There could be some variations which will not influence the substance of the invention.

We claim:

1. A heat exchange apparatus for cooling and recovering moisture from a gas, comprising, a first fluid circuit including an inlet section and an outlet section in which the gas to be cooled is conveyed, a second fluid circuit through which a refrigeration medium is conveyed, said inlet section of said first fluid circuit initially being disposed adjacent said second outlet section thereof so as to be in heat exchange relationship therewith, said inlet section thereafter extending adjacent said second fluid circuit so as to be in heat exchange relationship therewith, heat conducting fins extending between and connecting said inlet section of said first fluid circuit to said outlet section thereof and for connecting said inlet section of said first fluid section to said second fluid circuit, and a mass of particulate material placed between said fins, whereby the gas is initially cooled in heat exchange relationship with gas in the second section of said first fluid circuit and is thereafter further cooled by being in heat exchange relationship with said refrigeration medium.

2. The heat exchange apparatus of claim 1 in which said fins are spaced between 1.5 to 4 mm with respect to one another.

3. The heat exchange apparatus of claim 1 in which said mass of material is selected from a group of materials consisting of sand, metal powders, cement agglomerates and hydraulic limes.

4. The heat exchange apparatus of claim 1 in which said mass of material is soaked with water.

5. The heat exchange apparatus of claim 4 including thermostat means disposed within said mass of material, a compressor means within said second fluid circuit, said thermostat means being operable to control said compressor of said second fluid circuit in response to temperatures within said mass of material.

6. The heat exchange apparatus of claim 1 including a condensate trap mounted between said inlet section and said outlet section of said first fluid circuit.

7. A heat exchange apparatus for cooling and recovering moisture from a gas, comprising, a first fluid circuit including an inlet section and an outlet section in which the gas to be cooled is conveyed, a second fluid circuit through which a refrigeration medium is conveyed, said inlet section of said first fluid circuit initially being disposed adjacent said second outlet section thereof so as to be in heat exchange relationship therewith, said inlet section thereafter extending adjacent said second fluid circuit so as to be in heat exchange relationship therewith, heat conducting fins extending between and connecting said inlet section of said first fluid circuit to said outlet section thereof and for connecting said inlet section of said first fluid section to said second fluid circuit, and a freezable liquid being disposed between said fins, whereby the gas is initially cooled in heat exchange relationship with gas in the second section of said first fluid circuit and is thereafter further cooled by being in heat exchange relationship with said refrigeration medium.

* * * * *